(12) United States Patent
Vengerov et al.

(10) Patent No.: US 8,276,143 B2
(45) Date of Patent: Sep. 25, 2012

(54) DYNAMIC SCHEDULING OF APPLICATION TASKS IN A DISTRIBUTED TASK BASED SYSTEM

(75) Inventors: David Vengerov, Santa Clara, CA (US); Seth Proctor, Concord, MA (US)

(73) Assignee: Oracle America, Inc., Redwood City, CA (US)

( * ) Notice: Subject to any disclaimer, the term of this patent is extended or adjusted under 35 U.S.C. 154(b) by 1016 days.

(21) Appl. No.: 12/045,064

(22) Filed: Mar. 10, 2008

(65) Prior Publication Data

US 2009/0228888 A1 Sep. 10, 2009

(51) Int. Cl.
*G06F 9/46* (2006.01)
*G06F 9/50* (2006.01)

(52) U.S. Cl. ............... 718/102; 718/103; 718/105

(58) Field of Classification Search .......... 718/102, 718/103, 105
See application file for complete search history.

(56) References Cited

U.S. PATENT DOCUMENTS

| | | | |
|---|---|---|---|
| 5,524,077 A * | 6/1996 | Faaland et al. ............ 705/7.21 |
| 5,745,687 A | 4/1998 | Randell |
| 5,798,950 A | 8/1998 | Fitzgerald |
| 6,170,083 B1 | 1/2001 | Adl-Tabatabai |
| 6,438,704 B1 | 8/2002 | Harris et al. |
| 6,804,249 B1 | 10/2004 | Bass et al. |
| 6,986,137 B1 | 1/2006 | King et al. |
| 7,007,276 B1 | 2/2006 | Kubala et al. |
| 7,010,788 B1 * | 3/2006 | Rehg et al. ............ 718/100 |
| 7,072,805 B2 | 7/2006 | Cascaval et al. |
| 7,073,175 B2 * | 7/2006 | Rehg et al. ............ 718/102 |
| 7,159,221 B1 | 1/2007 | Willen et al. |
| 7,289,939 B2 | 10/2007 | Cascaval et al. |
| 7,293,260 B1 | 11/2007 | Dmitriev |
| 7,325,234 B2 | 1/2008 | Smith |
| 7,461,380 B2 | 12/2008 | Nishimura |
| 7,548,335 B2 | 6/2009 | Lawrence et al. |
| 7,647,585 B2 | 1/2010 | Sun |
| 7,676,483 B2 | 3/2010 | Klug |
| 7,689,998 B1 | 3/2010 | Chrysanthakopoulos |
| 7,761,875 B2 * | 7/2010 | Karamanolis et al. ...... 718/102 |
| 7,802,236 B2 | 9/2010 | Calder et al. |
| 7,904,324 B2 * | 3/2011 | Gura ............ 705/7.13 |
| 8,005,705 B2 * | 8/2011 | Gura et al. ............ 705/7.26 |
| 8,010,396 B2 * | 8/2011 | Gura ............ 705/7.12 |
| 2003/0066055 A1 | 4/2003 | Spivey |
| 2003/0172104 A1 | 9/2003 | Hooman et al. |
| 2003/0233341 A1 | 12/2003 | Taylor et al. |
| 2004/0015973 A1 | 1/2004 | Skovira |
| 2004/0054999 A1 | 3/2004 | Willen et al. |
| 2005/0021712 A1 | 1/2005 | Chassapis et al. |
| 2005/0065826 A1 * | 3/2005 | Baker et al. ............ 705/7 |

(Continued)

OTHER PUBLICATIONS

Liu et al., On Means to Provide Flexibility in Scheduling, 1988, ACM pp. 32-34.

(Continued)

*Primary Examiner* — Aimee Li
(74) *Attorney, Agent, or Firm* — Polsinelli Shughart PC

(57) ABSTRACT

Disclosed herein is a system and method for dynamic scheduling of application tasks in a distributed task-based system. The system and method employ a learning mechanism that observes and predicts overall application task costs across a networked system, taking into account how the states or loads of the applications are likely to change over time. The application task costs are defined in economic terms. The system and method allows continuous optimization of application response times as perceived by application users.

15 Claims, 6 Drawing Sheets

U.S. PATENT DOCUMENTS

| | | | |
|---|---|---|---|
| 2005/0081200 A1* | 4/2005 | Rutten et al. | 718/100 |
| 2007/0220294 A1* | 9/2007 | Lippett | 713/320 |
| 2007/0220517 A1* | 9/2007 | Lippett | 718/102 |
| 2008/0002584 A1* | 1/2008 | Leng | 370/235 |
| 2008/0163183 A1* | 7/2008 | Li et al. | 717/149 |
| 2008/0235693 A1 | 9/2008 | Proctor et al. | |
| 2009/0328046 A1 | 12/2009 | Proctor et al. | |

OTHER PUBLICATIONS

Kwok et al., Static Scheduling Algorithms for Allocating Directed Task Graphs to Multiprocessors, Dec. 199, ACM, pp. 1-66.

Sethi, Programming Language Concepts and Constructs, 1990, Addison-Wesley Publishing Company, p. 212.

Fairley, Software Engineering Concepts, 1985, McGraw-Hill, Inc., pp. 106-109.

Amendment and Response regarding U.S. Appl. No. 11/726,830, Feb. 25, 2011.

Amendment and Response regarding U.S. Appl. No. 11/726,830, Jun. 14, 2011.

Final Office Action regarding U.S. Appl. No. 11/726,830, Mar. 14, 2011.

Non-Final Office Action regarding U.S. Appl. No. 11/726,830, Oct. 27, 2010.

Amendment and Response regarding U.S. Appl. No. 12/163,324, Dec. 19, 2011.

Non-Final Office Action regarding U.S. Appl. No. 12/163,324, Sep. 19, 2011.

Sutton et al., Reinforcement Learning: An Introduction, 1998, MIT Press.

* cited by examiner

Predicted Costs C(s) For A Specific Application In Various States And On Various Nodes

| Nodes ▲<br>States ▼ | Node (0) | Node (1) | Node (2) | Node (n) |
|---|---|---|---|---|
| State (0) | Cost $C(s_{0-0})$ | Cost $C(s_{0-1})$ | Cost $C(s_{0-2})$ | Cost $C(s_{0-n})$ |
| State (1) | Cost $C(s_{1-0})$ | Cost $C(s_{1-1})$ | Cost $C(s_{1-2})$ | Cost $C(s_{1-n})$ |
| State (2) | Cost $C(s_{2-0})$ | Cost $C(s_{2-1})$ | Cost $C(s_{2-2})$ | Cost $C(s_{2-n})$ |
| State (n) | Cost $C(s_{n-0})$ | Cost $C(s_{n-1})$ | Cost $C(s_{n-2})$ | Cost $C(s_{n-n})$ |

FIG. 3

DYNAMIC SCHEDULING OF APPLICATION TASKS IN A DISTRIBUTED TASK BASED SYSTEM

FIELD OF THE INVENTION

The present invention relates to task-based systems. More specifically, the present invention relates to the scheduling of application tasks in a distributed task-based system.

BACKGROUND

In task-based systems, short-lived tasks run in the context of applications distributed over network computing nodes, such as game servers. Each computing node has it own scheduler that determines how to allocate the node's available computing resources among tasks from different applications running on that node. Once a task is started, it runs to completion. The rate at which tasks are generated by an application on a given node is correlated with the number of "local" application users on that node and to a smaller extent with the number of "remote" users logged into other instances of that application on other network nodes. The expected execution time for a task from user j on node N depends on the number of users on node N with whom user j is currently interacting and on the number of users on all other nodes with whom user j is currently interacting.

Each application has a queue to hold those tasks generated by the application, but not yet scheduled for execution on a node. The scheduler has algorithms that implement policies to ensure a certain amount of the computing resources of the node is available to each application running on the node. Examples of scheduling algorithms include: scheduling applications tasks in a round-robin fashion; creating fixed resource partitions for all applications; and allocating "tickets" to each application at a certain fixed rate, which is determined by the network administrator, and "charging" each application a certain number of tickets for scheduling each of its tasks. While these example scheduling algorithms work towards ensuring a certain amount of computing resources are available to each application running on a node, the scheduling algorithms fail to optimize user experience (e.g., in terms of user perceived response time) in distributed network-based applications (e.g., network games). Consequently, there is a need in the art for a system and method for scheduling application tasks in a way that optimizes user experience.

SUMMARY

Disclosed herein is a method of dynamically scheduling application tasks in a distributed task-based system. In one embodiment, the method includes: considering potential task scheduling actions for each application on a node; determining a predicted cost for each of the potential scheduling actions; and selecting a scheduling action that minimizes the predicted sum cost for all applications running on the node.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 3 is a diagrammatic depiction of a state/cost matrix pertaining to a specific application and contained in the Cost C(s) Database of FIG. 2.

DETAILED DESCRIPTION OF EMBODIMENTS OF THE INVENTION

Disclosed herein is a system for dynamically scheduling applications in a distributed task-based system. In such a system, a scheduler may control application response time by dynamically allocating computing resources among applications and by migrating some application users to different network nodes. Before scheduling an application's task for execution on the computing resources of a computing node, the system considers an expected future cost of the most relevant scheduling decisions and selects the decisions with the smallest cost. Similarly, user migration decisions are made by considering the expected future costs of the most relevant migration decisions and by selecting the decision with the smallest cost. By making task scheduling decisions based on such considerations, the system is able to continually optimize the application response times observed by all application users in the network.

Figure 1:
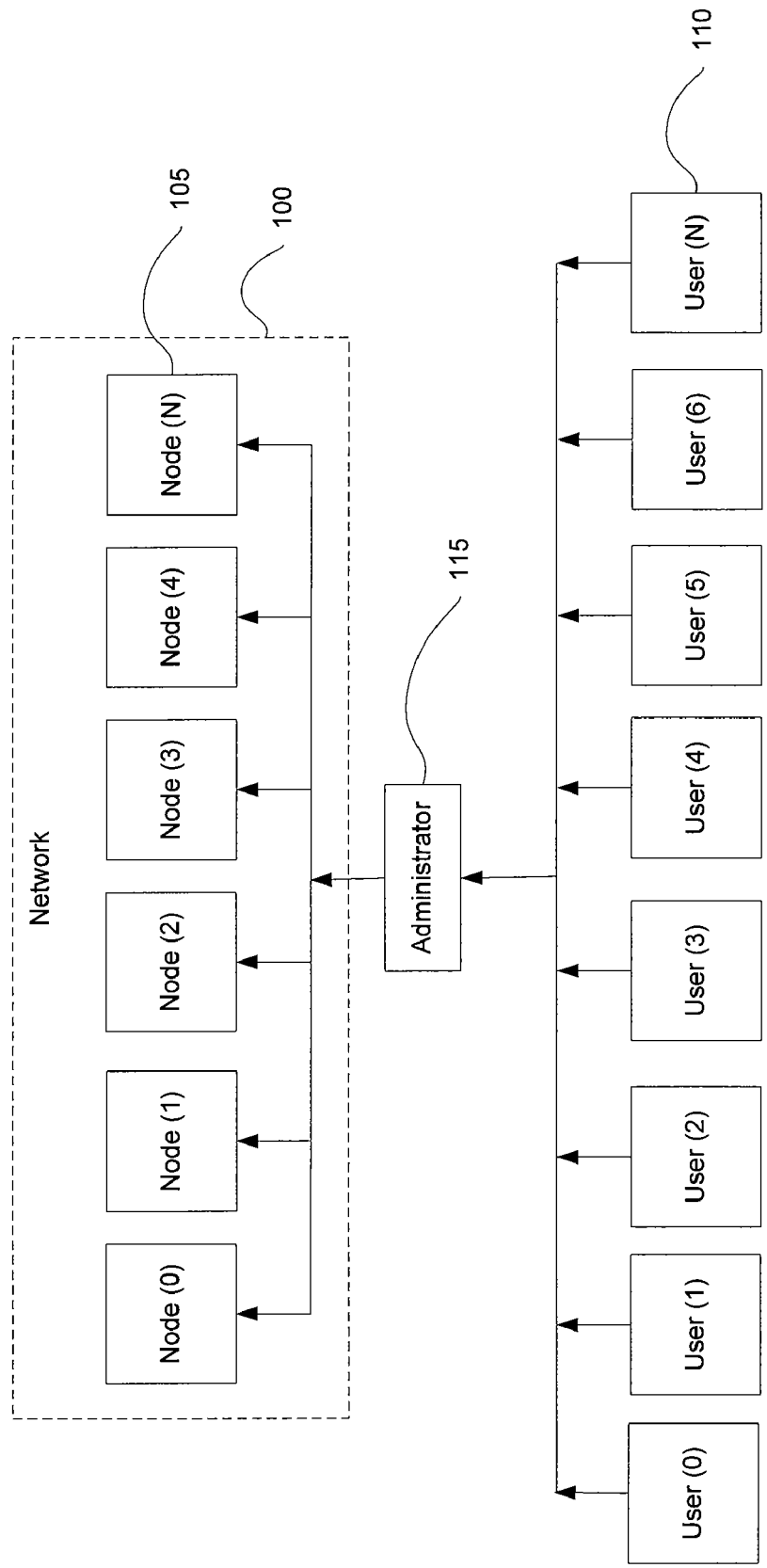
FIG. 1 is a diagrammatic depiction of a computing network including computing nodes that are accessed by users.

As diagrammatically depicted in FIG. 1, a computing network 100 includes computing nodes (e.g., game servers) 105 that are accessed by users 110. An administrator 115 determines which scheduling policies are employed for the network 100.

Figure 2:
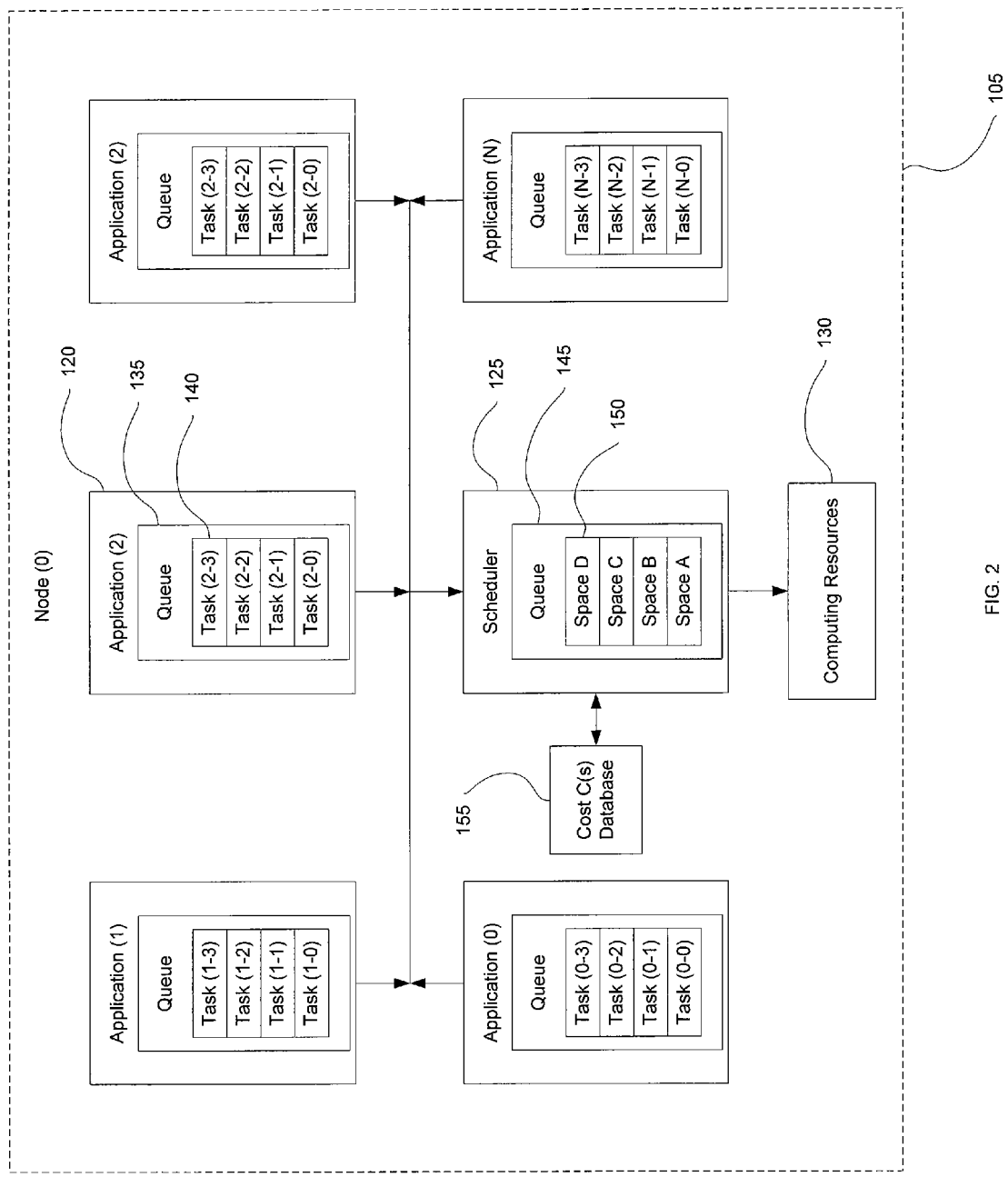
FIG. 2 is a diagrammatic depiction of an example computing node of FIG. 1.

FIG. 2 is a diagrammatic depiction of an example computing node 105 of FIG. 1. As shown in FIG. 2, the node 105 includes multiple applications (e.g., network games) 120 running on the node 105, a scheduler 125, and computing resources 130 of the node 105. Each application 120 includes a queue 135 with spaces for holding tasks 140 generated by the application 120, but not yet scheduled for execution on the computing resources 130 of the node 105. The scheduler 125 includes a queue 145 with spaces 150 for receiving therein tasks 140 received from the applications 120 and scheduled for execution on the computing resources 130.

There is a computing resource cost C(s) associated with each task 140 of an application 120 to be scheduled for execution on the computing resources 130 of a node 105. In one embodiment, the cost C(s) may be defined as the expected future task response time starting from state s right after a scheduling decision or user migration decision is taken. In one embodiment, the cost may be measured as a function of the average task response time experience by the user(s) 110 of the application 120. In the spirit of load balancing, in one embodiment, the cost C(s) perceived by users 110 for applications 120 and tasks 140 running on a given node 105 should be equal. In one embodiment, cost C(s) is the expected future average response time for a task of an application or node, depending on the particular cost function used.

The task load or state s of each application 120 assigned to a node 105 changes dynamically over time. Thus, whenever a scheduling decision can be taken, a way for selecting the best scheduling decision is by using the cost functions C(s).

In addition to having an expected future impact on cost C(s), various task scheduling actions taken by the scheduler 125 present different probability distributions over the possible application states s that may be observed during the next scheduling decision point. Taking this into account, when making a task scheduling determination, the system disclosed herein considers the expected future cost C(s) impact. It may be said that, in at least one embodiment, the expected future cost C(s) takes everything into account such that the expectation is taken over all possible future state trajectories.

In one embodiment, the method disclosed herein would compare costs $C_i(s_i')$, wherein i indexes the various decisions and $(s_i')$ is the state that will arise immediately after decision i is taken. This state can be perfectly predicted in many domains. In another embodiment, for domains where no immediate impact of an action is observed, function $C_i(s, a_i)$ may be used, wherein $a_i$ indexes various decisions that can be taken in state s.

As indicated in FIG. 2, in one embodiment, a node 105 may include a cost C(s) database 155 in communication with the scheduler 125. The database 155 may contain data predicting the expected average cost C(s) per time step that will be observed if the application 120 in question enters into state s. For example, the database 155 may contain data predicting the expected average cost $C(s_i)$ per time step for application i when application i is in state $s_i$.

In one embodiment, for each application 120 running on a node 105, costs C(s) are correlated with specific applications states s on specific nodes 105. The correlations between the costs C(s), the states s, and the nodes 105 may be contained in a state/cost matrix 156 as depicted in FIG. 3. As can be understood from FIG. 3, in one embodiment, the state/cost matrix 156 includes a plurality of states s 157 correlated with a plurality of nodes 105. The intersection 158 of a specific state s 157 of the application 120 with a specific node 105 provides the Cost C(s) 158 associated with the specific application starting out on the specific node 105 and specific state s 157. The corresponding Cost C(s) may be determined with a long term cost function, as discussed later in this Detailed Description.

Figure 4:
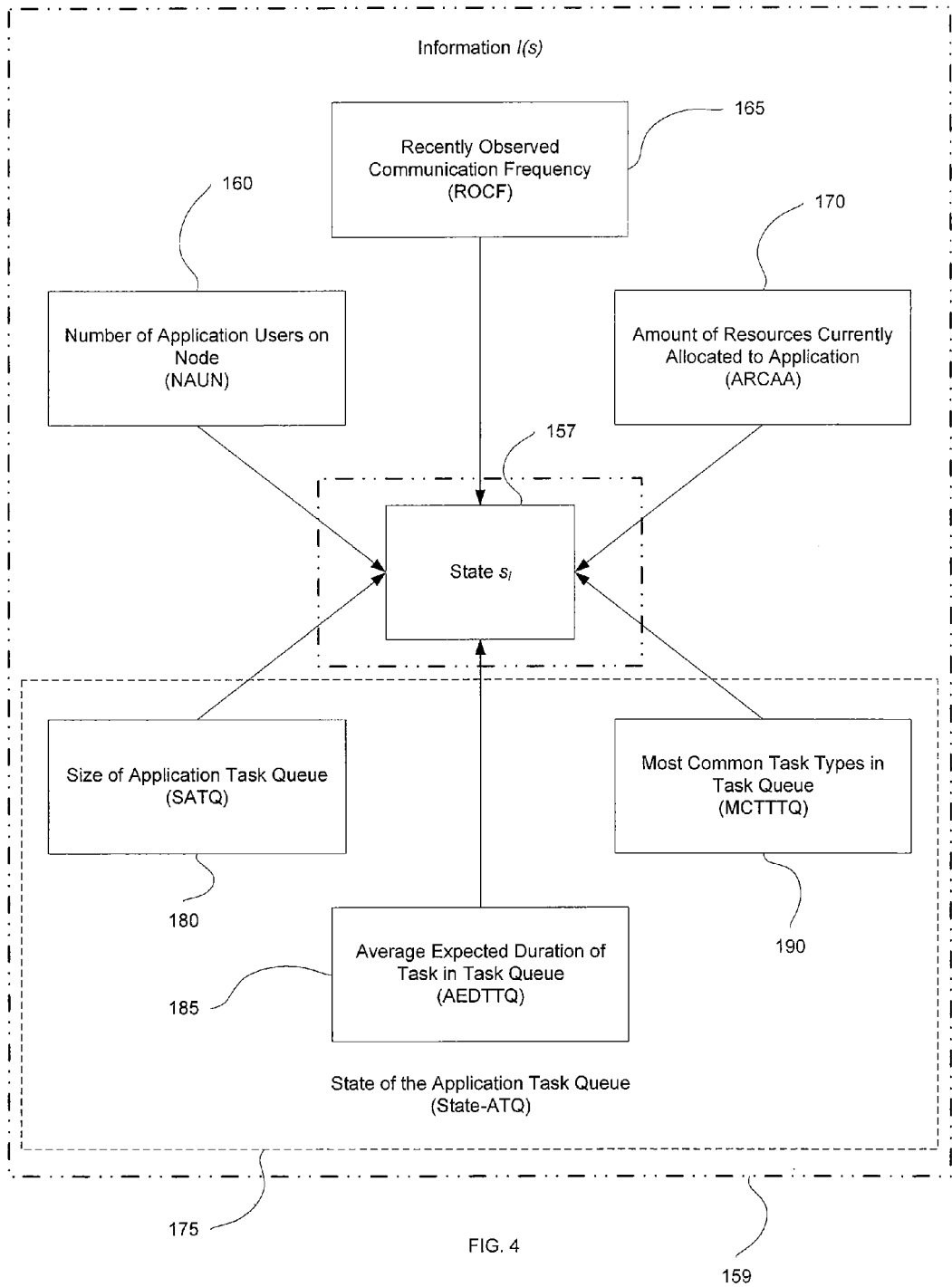
FIG. 4 is a diagrammatic depiction of the types of information utilized to define a specific state s of the state/cost matrix of FIG. 3.

Certain types of information I(s) 159 may be employed to define or describe the state s 157 of a specific application 120 on a specific node 105. For example, in one embodiment, as depicted in FIG. 4, which is a diagrammatic depiction of a specific state s 157 of the state/cost matrix 156 of FIG. 3, examples of types of information I(s) 159 employed to define the state s 157 of a specific application 120 on a specific node 105 may include: the number of application users 110 on the node 105 ("NAUN") 160; the recently observed communication frequency ("ROCF") 165 with users 110 on other nodes 105, wherein a higher communication frequency implies a higher probability of new tasks 140 being generated; the amount of communication resources currently allocated to the application 120 ("ARCAA") 170; and the state of the application task queue 135 ("State-ATQ") 175. The State-ATQ 175 may include the following information I(s) such as: the size of the application task queue 135 ("SATQ") 180; the average expected duration of tasks 140 in the application task queue 135 ("AEDTATQ") 185; and the most common task types in the application task queue 135 (MCTTATQ") 190.

In one embodiment, when making scheduling determinations, the scheduler 125 accesses the information in the Cost C(s) Database 155 and, at each point in time, takes the scheduling action that minimizes total costs C(s) for all applications 120 running on the node 105. In other words, the appropriate scheduling action for the scheduler 125 to take when scheduling tasks 140 to resources 130 will be the scheduling action that minimizes the sum cost $\Sigma C(s')$ for all applications 120 running on the node 105, as reflected in the following equation: $\Sigma C(s')=C_i(s_i')+C_j(s_j')+ \ldots +C_n(s_n')$, wherein $C_i(s_i')$, $C_j(s_j')$, and $C_n(s_n')$ are specific costs C(s) of specific applications i, j, n at specific states $s_i'$, $s_j'$, $s_n'$ that arise immediately as a result of the scheduling action taken by the scheduler 125. An example of a scheduling action that may minimize the sum cost $\Sigma C(s')$ for all applications 120 running on the node 105 includes changing the resources allocated to one or more specific applications.

In attempting to minimize the sum cost $\Sigma C(s')$ for all applications 120 running on a node 105, the scheduler 125 may take a scheduling action wherein users 110 are accepted from a different node 125 or migrated to a different node 125. In one embodiment, such an acceptance or migration may occur if the sum costs $\Sigma C(s')$ for all applications on the various nodes 105 after the acceptance or migration is less than the sum costs $\Sigma C(s)$ for all application on the various nodes 105 before the acceptance or migration. In other words, where $C^n(S'^n)+C^m(S'^m)+ \ldots +C^z(s^{z'})<C^n(s^n)+C^m(s^m)+ \ldots +C^z(s^z)$, wherein $C^n(s^n)$, $C^m(S^m)$ and $C^z(s^z)$ are specific costs C(s) of an application on nodes n, m, z before the acceptance or migration action is taken and $C^n(S'^n)$, $C^m(S'^m)$ and $C^z(s^{z'})$ are specific costs C(s) of an application on nodes n, m, z after the acceptance or migration action is taken.

It is also possible to use one cost function C(s) per node for making user migration decisions.

As stated above, when scheduling the tasks 140 of the various applications 120 running on the node 105, the node's scheduler 125 has access to a long term cost function C(s). In one embodiment, an accurate cost function C(s) may be determined by employing a "Reinforcement Learning" ("RL") methodology. For more information regarding RL methodologies, reference is made to R. S. Sutton and A. G. Barton, *Reinforcement Learning: An Introduction*, MIT Press, 1998, which is incorporated by reference in its entirety into this Detailed Description.

Figure 5:
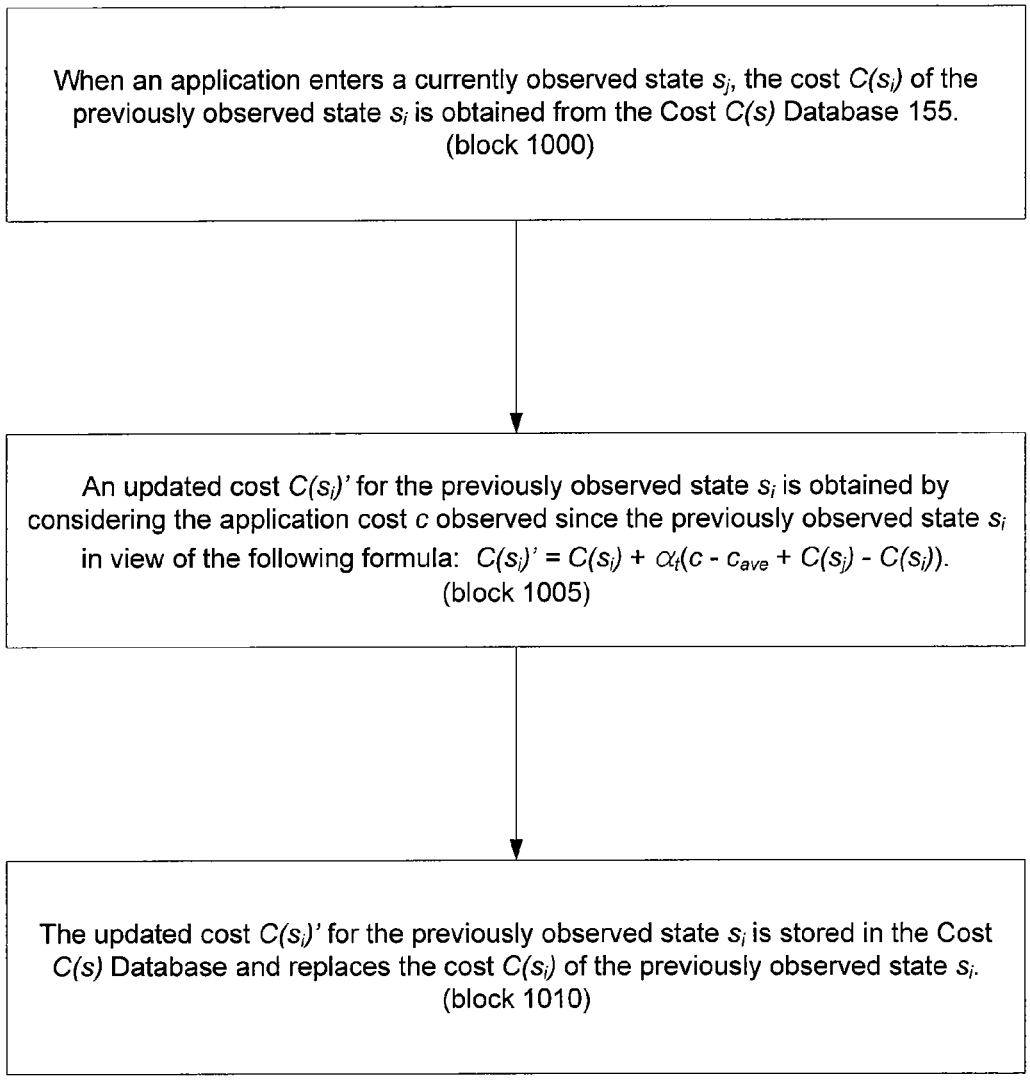
FIG. 5 is a flow diagram depicting a process for updating the cost function C(s) for each state s.

In one embodiment, the system and method disclosed herein employs the following RL methodology: $C(s_i)'=C(s_i)+\alpha_t(c-c_{ave}+C(s_j)-C(s_i))$, wherein $C(s_i)'$ is the updated cost for the previously observed state $s_i$, $C(s_i)$ is the cost of the previously observed state $s_i$, $\alpha_t$ is a learning rate that should be decreased over time t (e.g., by using $\alpha_t=1/t$), c is the application cost observed since state $s_i$ (e.g., the average value of the completed tasks), $c_{ave}$ is the average value of c since the beginning of the cost tuning process, and $C(s_j)$ is the cost of a currently observed state $s_j$. Thus, whenever an application state $s_j$ is currently observed, the cost $C(s_i)$ of the previously observed state $s_i$ is updated to an updated cost $C(s_i)'$ using the aforementioned RL methodology. In other words, as can be understood from FIG. 5, which is a flow diagram depicting a process for updating the cost function C(s) for each state s, when an application 120 enters a currently observed state $s_j$, the cost $C(s_i)$ of the previously observed state $s_i$ is obtained from the Cost C(s) Database 155 (block 1000). An updated cost $C(s_i)'$ for the previously observed state $s_i$ is obtained by considering the application cost c observed since the previously observed state $s_i$ in view of the following formula: $C(s_i)'=C(s_i)+\alpha_t(c-c_{ave}+C(s_j)-C(s_i))$ (block 1005). The updated cost $C(s_i)'$ for the previously observed state $s_i$ is stored in the Cost C(s) Database 155 and replaces the cost $C(s_i)$ of the previously observed state $s_i$ (block 1010).

In one embodiment, the above-described cost updating procedure employing the above-described RL methodology is guaranteed to converge to the expected future cost C(s) of each state s assuming that all possible states s are visited infinitely often over the learning period. If the state space is very large and a very long time is need to visit every state s at least 100 times over the learning period, a more sophisticated RL methodology updating procedure can be used where the cost function is described in terms of parameters, which are tuned after every state observation. Such "more sophisticated" RL methodologies are well known in the art and need not be discussed here.

Figure 6:
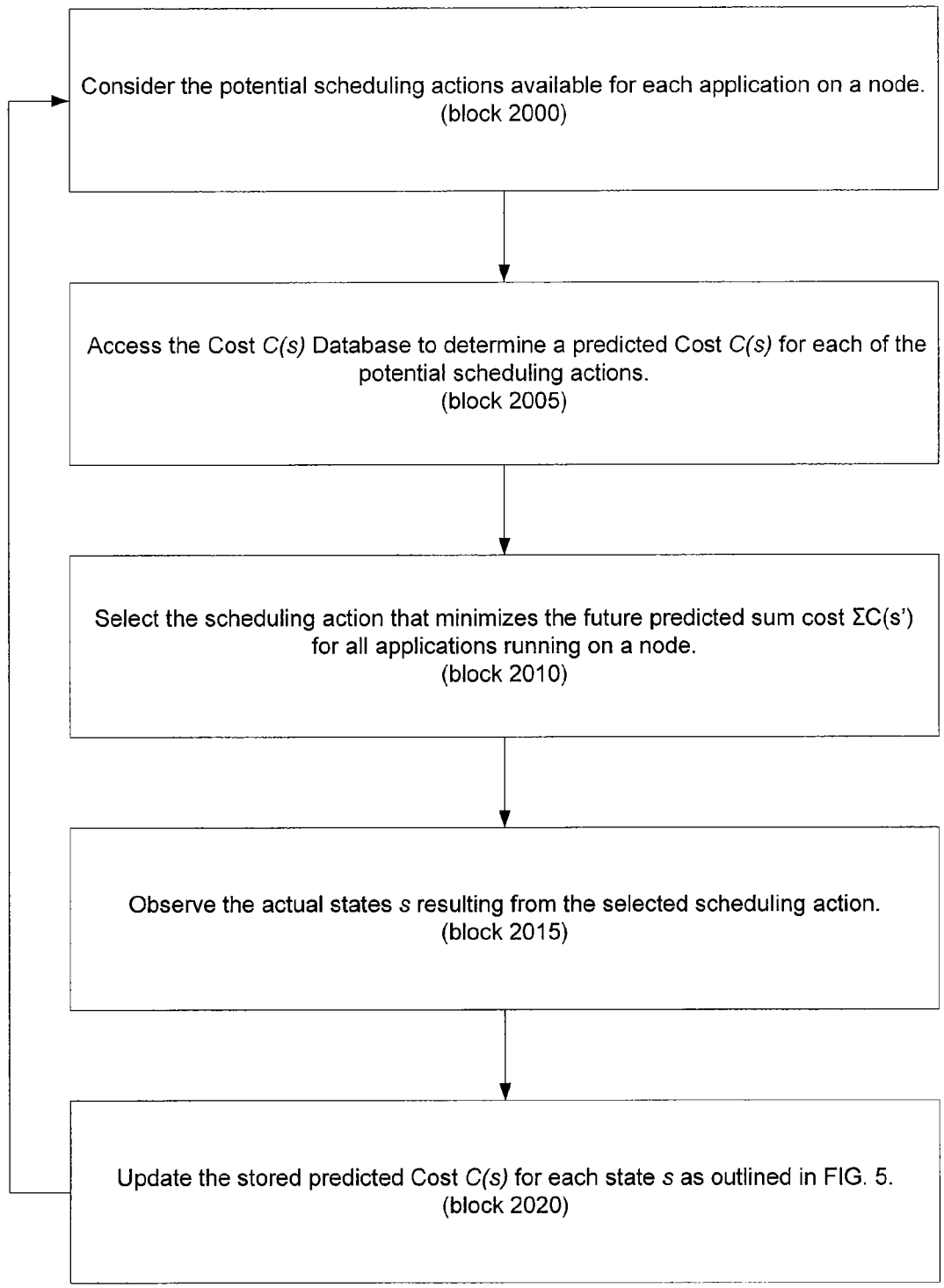
FIG. 6 is a flow diagram depicting an overview of the dynamic scheduling process disclosed herein.

In summary, the system and method disclosed herein dynamically schedules applications in a distributed task-based system. The scheduler controls application response time by dynamically allocating computing resources among applications and by migrating some application users to different network nodes. Before scheduling an application's task for execution on the computing resources of a computing node, the system considers a predicted immediate impact of the proposed scheduling action and the next most likely state for each application. For example, in one embodiment, as can be understood from FIG. 6, which is a flow diagram depicting an overview of the dynamic scheduling process disclosed herein, the scheduler 125 considers the potential scheduling actions available for each application 120 on a node 105 (block 2000). The scheduler 125 accesses the Cost C(s) Database 155 to determine a predicted Cost C(s) for each of the potential scheduling actions (block 2005). The scheduler 125 selects the scheduling action that minimizes the future predicted sum cost $\Sigma C(s')$ for all applications 120 running on a node 105 (block 2010). The system observes the actual states s resulting from the selected scheduling action (block 2015). The system updates the stored predicted Cost C(s) for each state s as outlined in FIG. 5 (block 2020). The process then repeats for the next round of scheduling actions (return to block 2000).

The system and method disclosed herein allow dynamic scheduling of application tasks in a distributed task-based system. The system and method employ a learning mechanism, such as a RL methodology, that observes and predicts overall application task costs across a networked system, taking into account how the states or loads of the applications are likely to change over time. The application task costs are defined in economic terms, such as average response time, percentage of tasks with response time greater than a certain threshold, the dollars earned from each completed task (e.g., if each user pays per-click and each click generates one or more tasks), or any other service level agreement ("SLA"). The system and method allows continuous optimization of application response times as perceived by application users.

It should be noted that, while the embodiments described herein may be performed under the control of a programmed processor, in alternative embodiments, the embodiments may be fully or partially implemented by any programmable or hardcoded logic, such as field programmable gate arrays (FPGAs), transistor transistor logic (TTL), or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention.

Embodiments within the scope of the present invention also include computer readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, PROM, EPROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications link or connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

We hereby claim:

1. A method of dynamically scheduling application tasks in a distributed task-based system, the method comprising:
    considering potential task scheduling actions for each application on a node;
    determining a predicted cost for each of the potential scheduling actions;
    selecting a scheduling action that minimizes a predicted sum cost for all applications running on the node;
    observing actual states of the applications resulting from the selected scheduling action; and
    updating the predicted cost for each state of each application, wherein updating the predicted cost for each state of each application includes employing a reinforcement learning methodology, the reinforcement learning methodology employing a following formula $C_i(s_i)' = C(s_i) + \alpha_t(c - c_{ave} + C(s_j) - C(s_i))$, wherein $C_i(s_i)$ is an updated cost for a previously observed state $s_i$, $C(s_i)$ is a cost of the previously observed state $s_i$, $\alpha_t$ is a learning rate that decreases over time, c is an application cost observed since states $s_i$, $c_{ave}$ is an average value of c since a beginning of the cost updating process, and $C(s_j)$ is a cost of currently observed state $s_j$.

2. The method of claim 1, wherein the predicted cost is measured as a function of an average task response time experienced by application users.

3. The method of claim 1, wherein the predicted cost is an average expected cost per time step that will be observed if an application in question enters into a state.

4. The method of claim 1, wherein the predicted cost is defined in economic terms.

5. The method of claim 4, wherein the economic terms include at least one of an average response time, a percentage of tasks with a response time greater than a certain threshold, dollars earned from each completed task, and a service level agreement.

6. The method of claim 1, further comprising accessing a database containing the predicted costs for each of the potential scheduling actions.

7. The method of claim 6, wherein the predicted costs stored in the database are organized so each predicted cost for a specific application is correlated with a specific state of the specific application on a specific node.

8. The method of claim 1, wherein the state of a specific application is determined from at least one of: a number of users of the specific application on a specific node; a recently observed communication frequency with users on other nodes; an amount of communication resources currently allocated to the specific application; and a state of a task queue of the specific application.

9. The method of claim 8, wherein the state of the task queue of the specific application includes at least one of: a size of the task queue; an average expected duration of tasks in the task queue; and the most common task types in the task queue.

10. The method of claim 1, wherein the selected scheduling action includes transferring at least one user between at least two nodes.

11. The method of claim 1, wherein the selected scheduling action includes changing the resources allocated to one or more specific applications.

12. A distributed task based computing system comprising:
a plurality of computing nodes including a first computing node;
a scheduler in communication with the first computing node, the scheduler configured to:
consider potential task scheduling actions for each application on a node;
determine a predicted cost for each of the potential scheduling actions;
selecting a scheduling action that minimizes the predicted sum cost for all applications running on the node;
observing actual states of the applications resulting from the selected scheduling action; and
updating the predicted cost for each state of each application, wherein updating the predicted cost for each state of each application includes employing a reinforcement learning methodology, the reinforcement learning methodology employing a following formula $C_i(s_i)'=C(s_i)+\alpha_t(c-c_{ave}+C(s_j)-C(s_i))$, wherein $C_i(s_i)$ is an updated cost for a previously observed state $s_i$, $C(s_i)$ is a cost of the previously observed state $s_i$, $\alpha_t$ is a learning rate that decreases over time, c is an application cost observed since states $s_i$, $c_{ave}$ is an average value of c since a beginning of the cost updating process, and $C(s_j)$ is a cost of currently observed state $s_j$.

13. The system of claim 12 wherein the predicted cost is based on at least one of a function of an average task response time experienced by application users and an average expected cost per time step that will be observed if an application in question enters into a state.

14. The system of claim 12 wherein the predicted cost is defined in economic terms including at least one of an average response time, a percentage of tasks with a response time greater than a certain threshold, dollars earned from each completed task, and a service level agreement.

15. The system of claim 12 wherein the scheduler is further configured to access a database containing the predicted costs for each of the potential scheduling actions, the predicted costs stored in the database are organized so each predicted cost for a specific application is correlated with a specific state of the specific application on a specific node.

* * * * *